United States Patent

[11] 3,621,302

[72] Inventor Wilbur David Pricer
Poughkeepsie, N.Y.
[21] Appl. No. 791,477
[22] Filed Jan. 15, 1969
[45] Patented Nov. 16, 1971
[73] Assignee International Business Machines Corporation
Armonk, N.Y.

[54] MONOLITHIC-INTEGRATED SEMICONDUCTOR ARRAY HAVING REDUCED POWER CONSUMPTION
5 Claims, 3 Drawing Figs.

[52] U.S. Cl. .......... 307/291, 307/238, 307/296, 328/206
[51] Int. Cl. .......... H03k 3/286
[50] Field of Search .......... 307/238, 291, 292, 296, 290

[56] References Cited
UNITED STATES PATENTS

| | | | |
|---|---|---|---|
| 3,226,574 | 12/1968 | Winkler .......... | 307/292 |
| 3,505,573 | 4/1970 | Wiedmann .......... | 307/291 |

*Primary Examiner*—John S. Heyman
*Assistant Examiner*—L. N. Anagnos
*Attorneys*—Hanifin and Jancin and Frank C. Leach, Jr.

ABSTRACT: A single power source is connected to a plurality of parallel-connected storage cells, which are in one of two bistable states, to provide a common constant-current source when the cells are in a standby storage condition and to apply a constant voltage source to increase the power level when the cells are in an active condition.

INVENTOR
W. DAVID PRICER
BY Frank C. Leach Jr.
ATTORNEY

MONOLITHIC-INTEGRATED SEMICONDUCTOR ARRAY HAVING REDUCED POWER CONSUMPTION

In monolithic integrated semiconductor arrays having storage cells of the flip-flop type, the size of the cells is such that application of power to the entire array creates a heat dissipation problem if power is continuously applied to the cells. To reduce this power dissipation, it has previously been suggested to employ a high-power level during the active condition of the cells and a low-power level when the cells are in a standby storage condition. Accordingly, high-speed response to read signal or high-speed switching due to a write signal is still obtained since the power level during read or write is high.

In flip-flop cells, it is necessary to maintain a predetermined minimum current, when the cell is in its standby storage condition, to insure that the cell remains in its selected bistable state. If this current should decrease below the predetermined minimum, then the cell may cease to remain in the selected bistable state.

The present invention requires only a single power source to provide a high-power level during the operating or active condition of the cell and a low-power level during active conditions. Furthermore, the present invention insures that a predetermined minimum current, which is sufficient to insure that each of the cells retains its selected bistable state, is supplied to each of the cells during the time that the cells are in a storage condition.

The present invention accomplishes this by utilizing a common constant current source when the cells are in the standby storage or inactive condition while employing a constant-voltage source during the time that one of the cells in the array is being interrogated or having its bistable state changed due to a write signal. This arrangement provides sufficient power to produce the required sensing current for quick response to the interrogation of the memory array or for rapid switching of the bistable state in response to a write signal while still producing a very low but steady current to each of the cells during the storage condition.

Because each of the cells is formed in the same chip, each of the cells has the same overall dynamic current-voltage characteristic. This is because the semiconductor material of the chip is of the same resistivity throughout the chip.

Therefore, by connecting the cells in parallel through a large impedance, which is formed in the same chip as the cells, to a constant voltage source, a common constant-current source is provided for each of the cells in it standby storage condition. This impedance is substantially large in comparison with the resistance of the cells so that a substantially constant current is supplied to each of the cells.

Because all of the cells are identical due to the cells being disposed in a single chip, the resistance of each of the cells is substantially the same so that each of the cells receives the same portion of the constant current, which is being supplied through the large impedance. As a result, the present invention insures that a single common constant-current source is provided for the storage cells of a monolithic-integrated semiconductor array when no read or write signal is supplied thereto and the cells are in the inactive or storage condition.

When one of the cells is to be interrogated or new information is to be written into the cell, the impedance of the present invention is shunted so that a relatively high current may be supplied to the cells when a read or write signal is to be supplied thereto. Thus, a common constant voltage source is connected to the cells when they are in the active condition.

When the cells are connected to the common constant-current source, the current level to each of the cells is such that the feedback between the transistors in each cell lowers the impedance of each of the cells in this inactive condition. As a result, the total impedance of the cells is less than the impedance of the cells when the large impedance is shunted during the read or write mode.

Due to this large impedance being formed in the monolithic array at the same time that the base of each of the transistors of the cells is formed, the resistance of this large impedance is limited if it is to occupy a reasonable area due to its dependence on the resistivity of the semiconductor material. Otherwise, the area of the resistor would have to be very long and narrow. Thus, the resistance of the large impedance is about 1,000 ohms.

By dividing the storage cells of a monolithic-integrated semiconductor array into a plurality of portions, the time when any portion of the cells is heated by the high-power level requirements can be further reduced. This is because each of the portions of the array would have its own single power source with a single impedance means connecting the power source to the cells, which are disposed in parallel, and means in parallel with the impedance means to shunt the impedance means.

Thus, the shunting means of a power source for a particular portion of the array would be activated to shunt the impedance means only when this portion of the array has the cell that was to receive a read or write signal. At all other times, the impedance means would be effective so that the power source for this portion of the array will be supplying power to this portion of the array at the low-power level.

An object of this invention is to provide a constant current source for low-level powering of a plurality of flip-flop cells in a monolithic-integrated semiconductor array having a plurality of flip-flop cells in a monolithic-integrated semiconductor array.

Another object of this invention is to provide a power arrangement for a monolithic-integrated semiconductor array having a plurality of flip-flop cells in which selective powering at a high-power level of various portions of the array is obtained.

A further object of this invention is to reduce the cost of a memory device.

The foregoing and other objects, features, and advantages of the invention will be more apparent from the following more particular description of the preferred embodiment of the invention as illustrated in the accompanying drawing.

Figure 1:
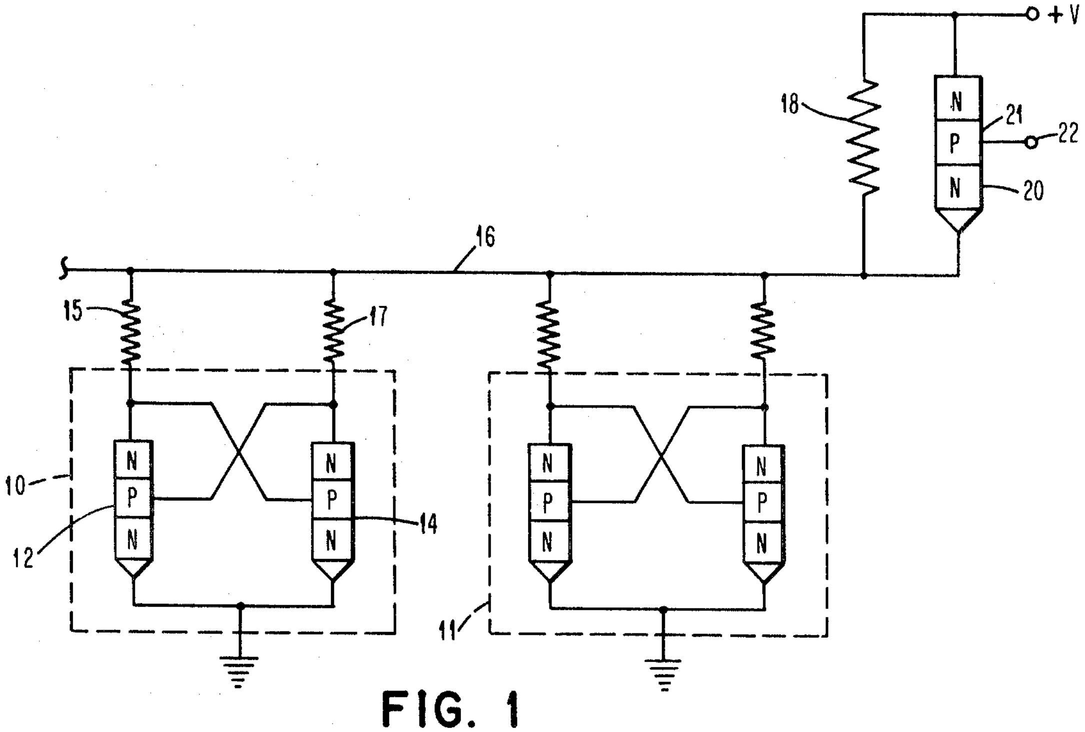
FIG. 1 is a circuit diagram of a portion of a monolithic-integrated semiconductor array utilizing the single power source of the present invention.

Referring to the drawing and particularly FIG. 1, there is shown a pair of storage cells 10 and 11 of the flip-flop type. Each of the flip-flop cells 10 and 11 includes a pair of transistors 12 and 14 having their bases connected to the collector of the other in the well-known manner to produce a flip-flop arrangement.

The transistor 12 has it collector connected through a resistor 15 to a conductor 16. The transistor 14 has its collector connected through a resistor 17 to the conductor 16. The cell 11 is formed in the same manner as the cell 10 and connected in the same manner to the conductor 16.

It should be understood that a plurality of the flip-flop cells of the type illustrated by the cells 10 and 11 would be connected to the conductor 16. All of these cells are formed simultaneously on the same chip so that they have the same dynamic current-voltage characteristic.

The conductor 16 is connected through a resistor 18 to a constant voltage source, +V The magnitude of the impedance of the resistor 18 is many times larger than the total impedance of the cells 10 and 11 when current is supplied to the cells through the resistor 18. Thus, when the voltage source, +V, is connected through the resistor 18 to the cells, a common constant current source is provided for each of the cells 10 and 11. Accordingly, as long as the voltage from the voltage source, +V, is applied to the cells 10 and 11 through the resistor 18, a very low but constant current is supplied to each of the transistors forming each of the cells 10 and 11. As a result, the transistors of each cell are maintained in the bistable state in which they have been placed with one of them being conducting and the other being nonconducting.

Figure 3:
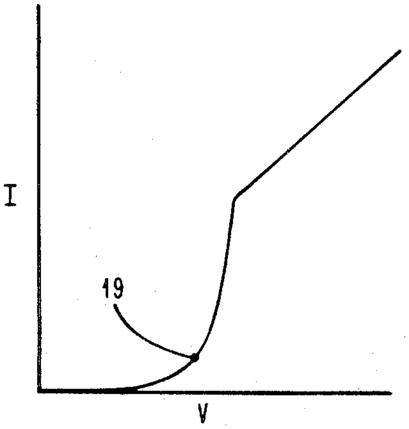
FIG. 3 is a plot illustrating the relationship of the current and voltage of one of the flip-flop cells of the array of FIGS. 1 and 2.

The impedance of the resistor 18 is selected so that the current in each cell will at least equal the current at point 19 on the plot of FIG. 3. At the point 19 in FIG. 3, sufficient current is supplied to each of the transistors in each of the cells 10 and 11 to maintain the transistors in the selected bistable state.

At this time, the feedback between the transistors in each of the cells is such as to maintain the impedance of the cells low in comparison with the impedance of the resistor 18. The impedance of each of the cells is less than the impedance when the resistor 18 is shunted.

A transistor 20 is connected in parallel with the resistor 18 between the conductor 16 and the voltage source, +V. As long as the transistor 20 is turned off, the cells 10 and 11 receive the relatively low substantially constant current from the common-current source.

However, whenever an input signal of sufficient magnitude is supplied to base 21 of the transistor 20 by input 22 to cause the transistor 20 to become saturated, the resistor 18 is shunted. When the transistor 20 is saturated, it offers substantially no resistance to the flow of current to the cells 10 and 11 from the common voltage source, +V. This results in a sufficiently high current being supplied to each of the cells 10 and 11 to cause them to have sufficient current to be in their operating or active condition whereby a read or write signal supplied thereto in the well-known manner causes an output to be supplied from the cell 10 or 11 that is interrogated or the cell 10 or 11 to have its bistable state changed due to the write signal.

Thus, a relatively low-power level is supplied to the cells 10 and 11 through utilizing the resistor 18 to produce a common constant-current source for the cells 10 and 11 unless reading or writing of the cells 10 and 11 is to occur. When interrogation or write is to occur whereby the cells are to be in the active condition, a signal to the input 22 that causes the transistor 20 to become saturated results in the resistor 18 being shunted. This causes the constant common voltage source, +V, to be supplied to the cells 10 and 11 to produce sufficient current for each of the cells 10 and 11 to cause them to be able to supply an output signal when a read or interrogation signal is applied thereto or to change the bistable state when a write signal is applied thereto.

It should be understood that the resistor 18 and the transistor 20 are both formed on the same chip as the cells 10 and 11. Furthermore, the transistor 20 is formed at the same time as the transistors 12 and 14 while the resistor 18 is formed at the same time as the bases of the transistors are formed. Of course, the resistors 15 and 17 also are formed when the resistor 18 is formed.

Figure 2:
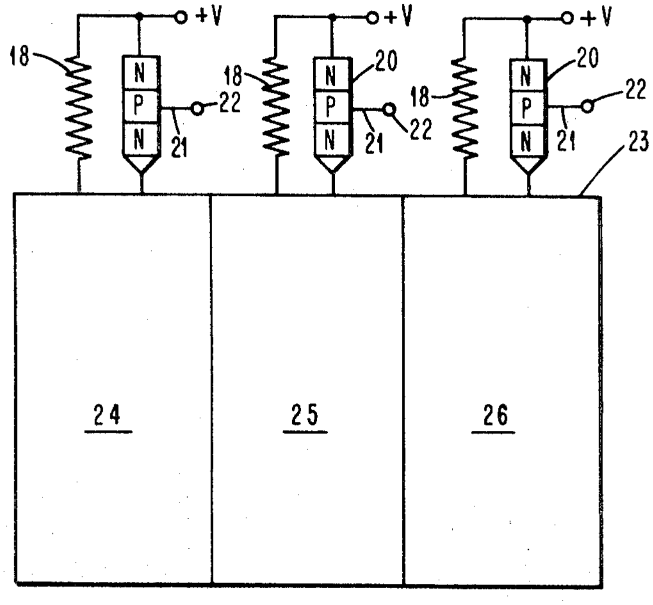
FIG. 2 is a schematic view showing various portions of the array connected to different power sources.

In FIG. 2, there is shown a monolithic-integrated semiconductor array 23 having a plurality of the cells 10 and 11 therein. The array 23 is divided into portions 24, 25, and 26 with each of the portions containing a plurality of the flip-flop cells 10 and 11. Each of the portions 24, 25, and 26 could be formed on a separate chip or the same chip, for example. While the array 23 is shown divided into three portions, this is for illustrative purposes only as the array may have any number of portions.

Each of the portions 24, 25, and 26 has one of the resistors 18 and one of the transistors 20 connected to one of the common voltage sources, +V. Thus, each of the portions 24–26 of the array 23 has one of the separate common voltage sources, +V.

Accordingly, as long as no input signal is supplied to the base 21 of any of the transistors 20 of the portions 24–26 by the input 22, each of the portions 24–26 will be at its low-power level. If only one of the cells in the portion 25 of the array 23 is to be interrogated, for example, then only the transistor 20, which is connected to the portion 25 of the array 23, will be saturated by a signal to its base 21 while each of the other two portions 24 and 26 will remain in its low-power level.

Thus, the present invention not only contemplates reducing the power level for a plurality of cells of a monolithic integrated semiconductor array but also contemplates dividing the array into a plurality of portions with only the portions, which are to have one of their cells interrogated at any specific instance, connected to full power. All of the other portions remain at the low-power level.

It should be understood that more than one of the portions 24–26 could be at its high-power level at the same time. This would depend on the input signals.

It should be understood that each of the cells 10 and 11 also would include the necessary additional circuitry to supply read and write signals to each of the cells. Likewise, each of the cells also must have an addressing input in addition to the addressing signal to the input 22 for the transistor 20.

By utilizing a constant current in the standby storage condition, the current level is maintained accurately at the point 19 in each cell irrespective of any temperature variation in the chip or any variations between chips such as temperature or normal manufacturing tolerances, for example. Thus, for example, even though the voltage across the cell may vary due to temperature variation, the current level is maintained at the point 19.

An advantage of this invention is that it reduces the power requirements for a monolithic-integrated semiconductor array. Another advantage of this invention is that only a single power source is required to retain the storage cells in their bistable states when in a storage condition and to activate the cells when they are to be in an operating condition. A further advantage of this invention is that it reduces the cost of a bilevel-power system.

While the invention has been particularly shown and described with reference to a preferred embodiment thereof, it will be understood by those skilled in the art that various changes in form and details may be made therein without departing from the spirit and scope of the invention.

What is claimed is:

1. A bilevel-powered monolithic-memory array comprising:
   a plurality of cells, each cell comprising a bistable circuit having a pair of cross-coupled transistors,
   means for applying bilevel power to the power input terminals of each of the cross-coupled transistors in each of the cells comprising
   a source of constant potential connected by first and second parallel conductive paths to only one output node, said output node being in turn connected in parallel to each of said power input terminals of each of said transistors in said plurality of cells,
   said first conductive path comprising high-impedance means having an impedance which is large in comparison with the total parallel impedance of said plurality of cells to current from said source of potential passing along said first path through said output node to the cells connected in parallel to provide a relatively low constant current to each of the cells to maintain each of the cells in its selected state when the cells are in their storage condition; and
   said second conductive path including a transistor which is nonconductive when the cells are in their constant-current storage condition, and means for rendering said transistor conductive to activate said second path to shunt said high-impedance first path and provide at said node a constant-voltage source connected to said plurality of cells in parallel to form a constant-voltage source for each of the cells to increase the magnitude of current flowing to each of the cells.

2. The monolithic-memory array of claim 1 wherein said cross-coupled transistors are bipolar transistors.

3. The monolithic-memory array of claim 2 wherein said transistor in said second conductive path is a bipolar transistor.

4. The monolithic-memory array of claim 1 wherein the impedance path connecting the two collectors of the cross-coupled transistors in each cell remains constant irrespective of the power level to which the cells are powered.

5. The monolithic-memory array of claim 1 wherein said power input terminals of said transistors are at the collectors of the transistors.

* * * * *